Figure 1:
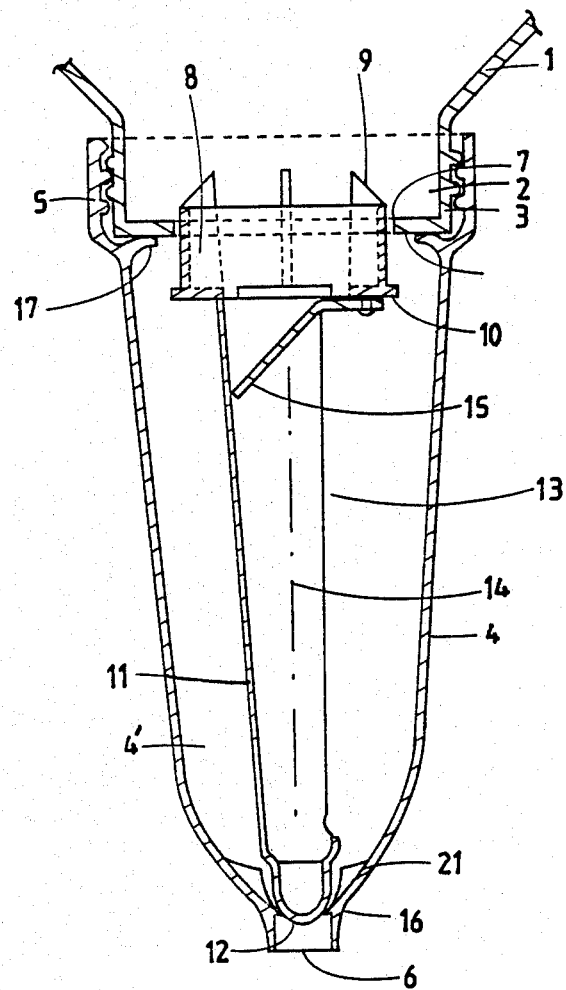

United States Patent [19]

Bottger et al.

[11] Patent Number: 4,828,150

[45] Date of Patent: May 9, 1989

[54] DEVICE FOR DISCHARGING CREAM OR PASTE-LIKE MATERIAL FROM A CONTAINER

[76] Inventors: Erik Bottger, Kjelsäsveien 61, N-0491 Oslo 4, Norway; Billy Nilson, Finnstugatan 30, S-59500 Mjölby, Sweden

[21] Appl. No.: 165,405

[22] Filed: Feb. 24, 1988

[30] Foreign Application Priority Data

Feb. 24, 1987 [NO] Norway ................................. 870743

[51] Int. Cl.4 ........................ B65D 47/22; G01F 11/28
[52] U.S. Cl. .................................... 222/207; 222/450; 222/453
[58] Field of Search ............... 222/207, 213, 445, 450, 222/451, 453, 495

[56] References Cited

U.S. PATENT DOCUMENTS

| 677,815 | 7/1901 | Sutton | 222/453 |
| 4,253,588 | 3/1981 | Lester et al. | 222/495 |
| 4,330,071 | 5/1982 | Ohlson | 222/207 |

FOREIGN PATENT DOCUMENTS 151928 3/1985 Norway ................................. 222/207

Primary Examiner—Joseph J. Rolla
Assistant Examiner—Steven M. Reiss
Attorney, Agent, or Firm—Browdy & Neimark

[57] ABSTRACT

A device for discharging cream or paste like material from a container, comprising a treat-like sleeve of a resilient material which has a mechanism for securing on an outlet on the container. The sleeve is intended for being provided in a depending position on the container. Inside the sleeve in the upper portion a body is provided, which is designed to be forced towards the container in case of an increase of pressure in the cream or paste-like material in the sleeve, and which is, via an elongated member, connected with the valve member at the lower end of the sleeve, the valve member cooperating with a discharge opening at the lower end of the sleeve. The body is dimensioned to be guided by the container outlet or another opening connected to the latter. A passage is provided through the body with an outlet opening inside the sleeve. A check valve is provided inside or near the channel or the passage. In a preferred embodiment the channel or passage is provided centrally in the body and cooperates with a channel or passage in the elongated member, and the outlet is then provided in a side wall of the elongated member.

6 Claims, 2 Drawing Sheets

DEVICE FOR DISCHARGING CREAM OR PASTE-LIKE MATERIAL FROM A CONTAINER

The present invention relates to a device for discharging fluids, especially cream or paste-like material from a container, comprising a teat shaped sleeve of a resilient material comprising means for being secured to an outlet on the container, and intended for being provided at the lower portion of said container. Inside said sleeve an elongated member is provided which has a radially enlarged portion at its upper end and is designed as a valve member at its lower end, said radially enlarged portion being designed to be forced in an axial direction towards the container in case of increased pressure in the cream or paste-like material, at the same time as the valve member is lifted off a valve seat at a lower discharge opening in said sleeve.

Devices of this kind are much used in restaurants to dispense ketchup, mustard, mayonnais, and similar cream-like material to be dosed according to varying demands. Such devices are more suitable than ordinary squeeze bottles, and the like, especially in connection with hot-dog stalls and the like. Squeeze bottles get messed up and it is, furthermore, impossible to restrict the doses taken from such bottles. Also, space is limited in a sausage stall and the like with only a narrow shelf or counter available for placing such bottles. Ordinary squeeze bottles are also more cumbersome and time consuming in use than is desirable, since it is necessary to turn them bottom up, shake them, or thrust them every time they are to be used in order to move the content of the bottle towards the discharge opening.

From Norwegian Patent No. 151,928 a device of the above mentioned kind is known, comprising a spheric body provided inside the teat shaped sleeve in connection with the discharge opening of the container. Said spheric body is, via a thin rod, connected with a valve body designed to close a lower discharge opening of the sleeve. This device is expensive in production since it consists of several members which have to be produced separately and then mounted. Also, a special guide has to be provided for the spheric member to prevent it from moving out of its proper position. Said spheric body acts as a valve body in a check valve and is designed for cooperation with a specially designed discharge opening in the container, or a specially shaped member attached at said discharge opening. Thus, the spheric body acts as a valve body and will close the discharge opening of the container when the resilient teat like sleeve is compressed to cause pressure in the matter inside the sleeve. When the spheric body moves upwards the lower valve body will be pulled upwards, via the rod, and the lower opening is, thus, opened for the paste like material to be squezzed out. This device, thus, also acts as a dosing device since no more paste can be squeezed out at a time than the quantity held by the teat like sleeve.

It is an object of the present invention to simplify a device of the above mentioned kind to make it less expensive in production and advantageous in use.

According to the invention this is achieved in a device of the kind mentioned above showing the features stated in the characterizing part of claim 1.

Further features of the invention will appear from the dependent claims.

Below, the invention is disclosed in more detail with reference to the drawing, which shows embodiments of a discharge means according to the invention.

Figure 1A:
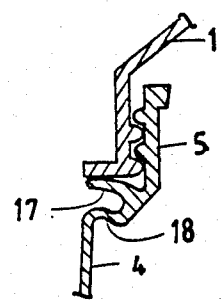
Figure 2:
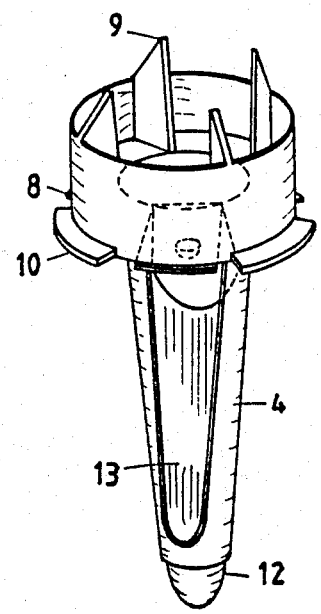
Figure 3:
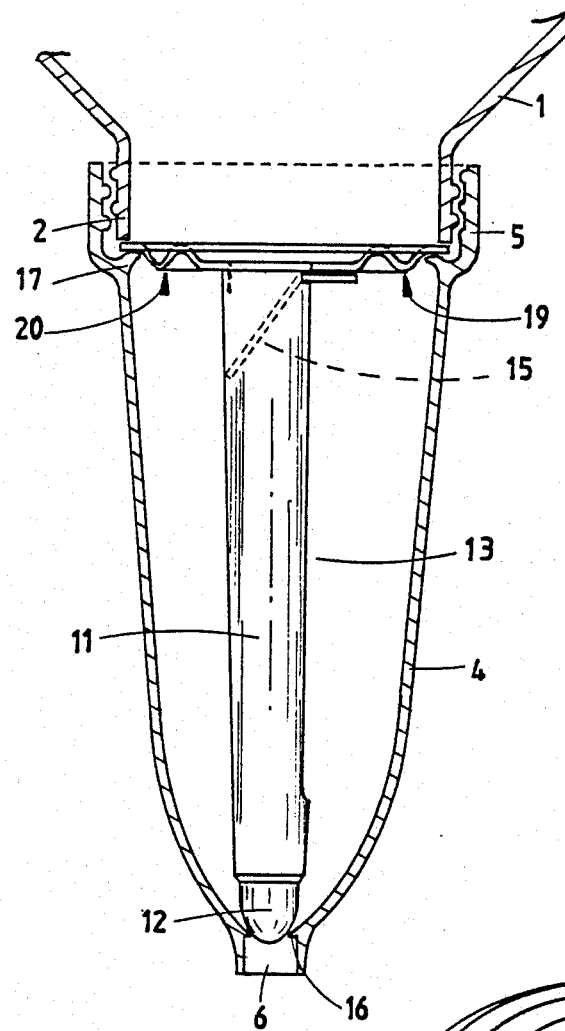
Figure 4:
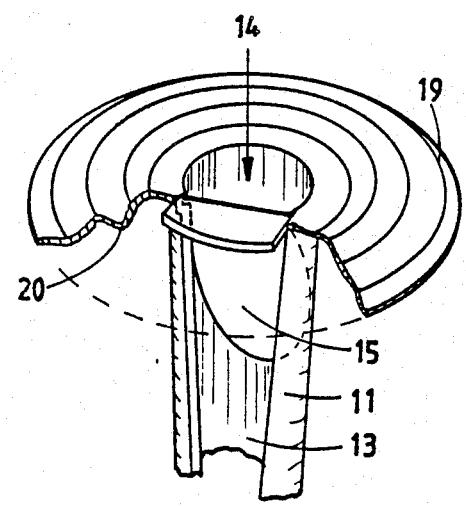

FIG. 1 shows a first embodiment of the invention in a side elevation and sectional view, FIG. 1a shows a modification of a detail in FIG. 1, FIG. 2 shows the unit comprising the elongated member, the body, and the valve body, FIG. 3 shows a second embodiment of the device according to the invention, and FIG. 4 shows a detail of FIG. 3 in a perspective view, and partly in section.

FIG. 1 shows the lower portion of a container 1 which contains a cream or paste formed material, and which is placed in a container, not shown, having its discharge opening 2 directed downwards. Discharge opening 1 in this embodiment is a threaded pipe stub 3 which may be closed by a screw cap, not shown.

On stub 3 a teat-like sleeve 4 is attached defining an interior space 41. The upper open end 5 of sleeve 4 has an internally threaded portion which may be screwed onto the stub threads. The other end of the sleeve is closed, apart from a discharge opening 6 serving to discharge the cream or paste formed material in container 1. In connection with contaienr stub 3 an annular flange 6 projecting inwards is provided to define the discharge opening 7 of the container. In the discharge opening a body 8 is provided the outside contour of which is adapted to discharge opening 7, which is preferably circular. Body 8, thus, acts as a plunger which is guided in opening 7. To enable the plunger shaped body to be readily introduced in opening 7 said plunger is provided with fins 9 on the inner side, which fins have an extension directed upwards with an inwards inclined outer edge. In order to limit the upwrads movement of plunger 8 when an external pressure is exerted on sleeve 5 the plunger is at its lower edge provided with a projecting annular flange 10 for cooperation with annular flange 6. Joined to the lower side of the plunger shaped body 8 within the space 41 is an elongated hollow body 11 the lower end of which forms a hemispherical head 12. In the wall of said elongated member 11 there is an opening 13, and in the channel or passage 14 of member 11 a resilient flexible flap valve 15 is provided across opening 13. The flap is attached to the upper face of annular flange 10 and extends obliquely downwards; it is shaped so as to be in sealing contact against inside of passage 14 in its closed position, as shown in full lines.

When a dose of cream or paste material is to be discharged from container 1 the teat like sleeve 4 is compressed. This will cause pressure in the matter contained in void 4' in the sleeve. Valve flap 15 will consequently be made to lie in sealing contact with channel or passage 14, and the pressure in the matter will force plunger 8 upwards and, thus, raise lower end 12 from its contact 16 acting as a valve seat at the bottom of sleeve 4. Discharge opening 6 is, thus, open and the pressure in the cream or paste material inside sleeve 4 will cause this material to be squeezed out through opening 6.

In the transition zone between the teat like sleeve 4 and the threaded open end 5 an inward facing annular lip 17 is provided and will ensure good sealing between the container and the teat like sleeve. This will appear most clearly from Figure 1a. In this Figure a bellows-like transition 18 is provided between the open portion 5 and the teat like sleeve in order to avoid fatigue fracture in this area which is subjected to heavy load in use.

In FIG. 3 a modification of the device according to the invention is shown. A circular diaphragm 19 provided with continuous folds 20 is attached to the upper end of the elongated member 11. This diaphragm will act as a plunger in case of internal pressure in the teat like sleeve 4 and will move upwards towards container 1, and bring along said elongated member 11 to lift valve member 12 from its valve seat 16 and liberate discharge opening 6. Inside teat like sleeve 4, at its lower end, close to valve seat 16 oblique guides 21 are provided to guide valve member 12 when it is moving.

The advantage of the invention is obvious. The plunger shaped body 8 with guide fins 9, the elongated member 11 and valve member 12 may be manufactured in one peace from plastic by injection molding. It is, thus, inexpensive in production, and can readily be kept clean. Due to the fact that plunger shaped body 8 is guided in opening 7 a rectilinear movement of the entire device is ensured. Due to the fact that a simple resilient flap valve is provided in the passage of the elongated member it is not necessary to provide the valve seat at the discharge stub.

According to a special feature of the invention plunger body 8, elongated member 11, and valve member 12 are manufactured from a material having a substantially the same own weight as the material to be discharged from the containers. Thus, very low forces are required to force plunger means upwards to open discharge 6.

Having thus described our invention, we claim:

1. A device in a means for discharging fluids, especially cream or paste matter from a container (1) comprising a teat shaped sleeve (4) of a resilient material, means (5) for securing on a discharge stub (2) on the container, and with an elongated member (11) being provided inside said sleeve (4) and at its upper end having a radially enlarged portion (8), and at its lower end being designed as a valve body (12), the radially enlarged portion (8) being intended to be forced in the axial direction towards said container (1) in case of an increase of pressure in the cream or paste material, and said valve body (12) at the same time being lifted off a valve seat at a lower discharge opening (6) in said sleeve (4), characterized in that the radially enlarged portion (8) is designed to be guided in the axial direction in a discharge opening (7) in the container, that a channel or passage (14) is provided in said enlarged portion (8) with an outlet (13) opening inside sleeve (4), that a check valve (15) is provided near the channel or passage (14), that said channel or passage (14) is centrally arranged in said radially enlarged portion (8) and cooperates with a channel or passage in said elongated member, and that said outlet (13) is provided in a side wall of said elongated member.

2. A device as defined in claim 1, characterized in that said radially enlarged portion (8), said elongated member (11), and said valve body (12) are manufactured in one piece from a material, having substantially the same own weight as the cream or paste material.

3. A device as defined in claim 1, characterized in that the check valve consists of a resilient flexible flap (15) provided in passage (14).

4. A device as defined in claim 3 characterized in that said flap (15) is obliquely arranged in the passage to seal against passage walls in a closed position.

5. A device as defined in claim 1, characterized in that the radially enlarged portion (8) consists of a flexible diaphragm (19) which is at its circumference connected with the container opening or a member connected with the latter, and that the diaphragm is provided with one or a plurality of continuous folds (20).

6. A device as defined in claim 1 wherein said material having substantially the same weight as the cream or paste material is plastic.

* * * * *